(12) United States Patent
Weinrib et al.

(10) Patent No.: US 12,273,832 B2
(45) Date of Patent: Apr. 8, 2025

(54) METHODS TO IMPROVE CONNECTIONLESS RECEPTION WINDOW WIDENING

(71) Applicant: Texas Instruments Incorporated, Dallas, TX (US)

(72) Inventors: Uri Weinrib, Mazkeret Batya (IL); Yaniv Weizman, Tel Aviv Jaffa (IL); Guy Mishol, Shoham (IL); Lior Gersi, Kfar Saba (IL); Omri Eshel, Kibut-Harel (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/668,440

(22) Filed: May 20, 2024

(65) Prior Publication Data

US 2024/0306104 A1    Sep. 12, 2024

Related U.S. Application Data

(63) Continuation of application No. 18/321,259, filed on May 22, 2023, now Pat. No. 12,022,416, which is a continuation of application No. 17/563,871, filed on Dec. 28, 2021, now Pat. No. 11,696,243.

(51) Int. Cl.
*H04W 56/00* (2009.01)
*H04W 4/80* (2018.01)

(52) U.S. Cl.
CPC ........... *H04W 56/001* (2013.01); *H04W 4/80* (2018.02)

(58) Field of Classification Search
CPC ....................................................... H04W 4/80
See application file for complete search history.

(56) References Cited

U.S. PATENT DOCUMENTS

| 9,794,880 | B1 | 10/2017 | Yamato | |
|---|---|---|---|---|
| 2013/0003715 | A1 | 1/2013 | Xhafa | |
| 2019/0020433 | A1 | 1/2019 | Pitigoi-Aron | |
| 2020/0413354 | A1* | 12/2020 | Thubert | H04W 56/001 |
| 2022/0278938 | A1 | 9/2022 | Waheed | |
| 2022/0279602 | A1* | 9/2022 | Xue | H04W 52/0241 |
| 2022/0408313 | A1 | 12/2022 | Mysore | |

* cited by examiner

*Primary Examiner* — David Bilodeau
(74) *Attorney, Agent, or Firm* — Michelle F. Murray; Frank D. Cimino

(57) ABSTRACT

An example apparatus includes: a memory; instructions in the apparatus; and a Bluetooth controller to execute the instructions to: enable circuitry to receive a synchronized transmission; determine if a synchronized transmission is received during a first duration; increment the first duration to a second duration as a result of not receiving the synchronized transmission during the first duration; and determine a third duration based on a determined difference in time between enabling circuitry to receive a synchronized transmission and receiving the synchronized transmission.

20 Claims, 8 Drawing Sheets

700

| LF CLOCK SOURCE (705) | OPTIMIZATION (710) | POWER CONSUMPTION (BEST CASE) (1s PERIODIC ADVERTISEMENT INTERVAL) (715) |
|---|---|---|
| EXTERNAL (XTAL) | NO | 9.2uA |
| INTERNAL (RCOSC) | NO | 14.4uA |
| INTERNAL (RCOSC) | YES | 11uA |

720 — EXTERNAL (XTAL) row
725 — INTERNAL (RCOSC) NO row
730 — INTERNAL (RCOSC) YES row

| LOCAL DRIFT (+/-ppm) (740) | PEER DRIFT (+/-ppm) (745) | POWER CONSUMPTION (BEST CASE) (1s PERIODIC ADVERTISEMENT INTERVAL) (750) |
|---|---|---|
| 40 (32Khz) | 40 (32Khz) | ~14 PERCENT REDUCTION (9.2uA ->7.9uA) |
| 500 (RCOSC) | 40 (32Khz) | ~24 PERCENT REDUCTION (14.4uA ->11uA) |
| 500 (RCOSC) | 500 (RCOSC) | ~37 PERCENT REDUCTION (17.4uA ->11uA) |

755 — first data row
760 — second data row
765 — third data row

FIG. 7B

METHODS TO IMPROVE CONNECTIONLESS RECEPTION WINDOW WIDENING

CROSS-REFERENCE TO RELATED APPLICATIONS

This application is a continuation of U.S. patent application Ser. No. 18/321,259 filed May 22, 2023, which is a continuation of U.S. patent application Ser. No. 17/563,871 filed Dec. 28, 2021, now U.S. Pat. No. 11,696,243, which applications are hereby incorporated herein by reference.

TECHNICAL FIELD

This description relates generally to buffering, and more particularly to methods to optimize connectionless reception (RX) widening.

BACKGROUND

Wireless personal area network communication utilize Bluetooth Low Energy (BLE) communication protocols to facilitate connectionless communications between BLE-compatible devices. Connectionless communication is a process wherein data is transmitted from one device to another using, typically periodic, advertisement events (herein advertisement events may be referred to as synchronized events and/or synchronized transmissions). Examples of such BLE-compatible devices commonly include desktop computers, laptop computers, tablets, smartphones, internet of things (IoT) devices, personal digital assistants (PDAs), etc. BLE-compatible devices are configured to exchange a periodic advertisement between and advertiser device and scanner device to synchronize clocks and transmit data. An advertiser device is a BLE-compatible device configured to periodically transmit a synchronized event as the periodic advertisement, such that synchronized transmissions are generated. A scanner device is a BLE-compatible device configured to periodically open a reception window to receive the synchronized event. The time duration between the scanner device opening the reception window and receiving the synchronized event decreases the power efficiency of the scanner device as a result of a BLE controller, included in the scanner device, being powered during the reception window.

SUMMARY

For methods to optimize connectionless RX widening, an example apparatus includes a memory; instructions in the apparatus; and a Bluetooth controller to execute the instructions to: enable circuitry to receive a synchronized transmission; determine if a synchronized transmission is received during a first duration; increment the first duration to a second duration as a result of not receiving the synchronized transmission during the first duration; and determine a third duration based on a determined difference in time between enabling circuitry to receive a synchronized transmission and receiving the synchronized transmission.

BRIEF DESCRIPTION OF THE DRAWINGS

FIG. 7A is a table of example power consumption based on operation of the BLE communication system of FIG. 1 with and without the process of FIG. 4.

FIG. 7B is a table of example power consumption based on operation of the BLE communication system of FIG. 1 including the process of FIG. 4.

The same reference numbers or other reference designators are used in the drawings to designate the same or similar (functionally and/or structurally) features.

DETAILED DESCRIPTION

Figure 1:
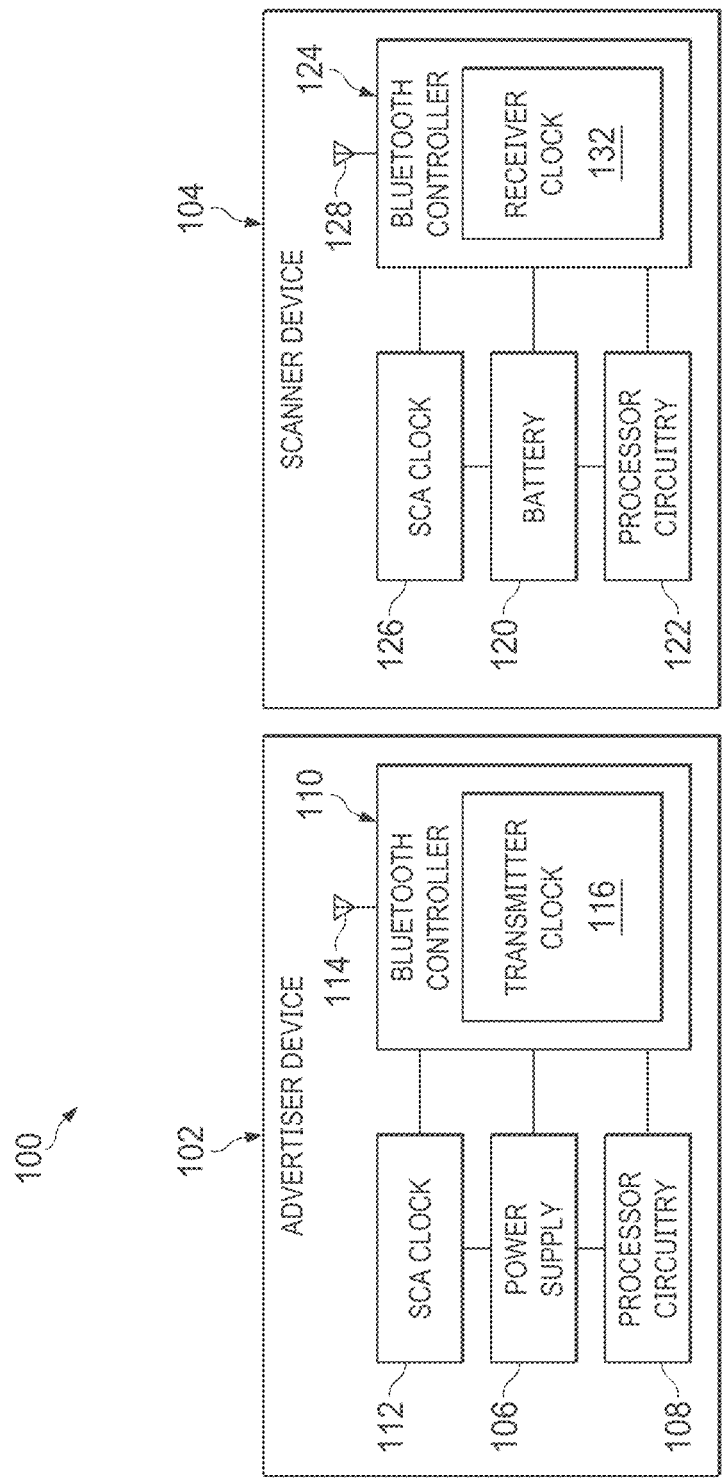
FIG. 1 is a schematic diagram of an example BLE communication system including an example advertiser device and an example scanner device.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Wireless personal area network communications utilize Bluetooth Low Energy (BLE) communication protocols to facilitate connectionless communications between BLE-compatible devices. Connectionless communication is a process wherein data is transmitted from one device to another using, typically periodic, synchronized events, such that synchronized transmissions are generated by a device. Examples of such BLE-compatible devices commonly include desktop computers, laptop computers, tablets, smartphones, internet of things (IoT) devices, personal digital assistants (PDAs), etc. A BLE-compatible device may be referred to as an advertiser device or a scanner device. The advertiser device and scanner device are configured be communicatively coupled to facilitate connectionless communications using BLE communication protocols. The advertiser device is configured to transmit a synchronized event at a time such that the scanner device may anticipate the synchronized event.

BLE communication protocols require the scanner device to initiate, typically periodic, anchor events to synchronize the advertiser device to the scanner device, such that connectionless communications may be synchronously received. An anchor event is a process wherein a Bluetooth controller is powered by the scanner device to receive a synchronized event (herein anchor events may be referred to as reception windows). An anchor event may be configured to receive a synchronized event on a data channel and/or secondary channel (e.g., a bandwidth within an industrial, scientific, and medical (ISM) bandwidth configured for data transmissions). The advertiser device is a BLE-compatible device configured to periodically transmit a synchronized event as the periodic advertisement. The synchronized event is one or more data packets, transmitted by the advertiser device to the scanner device, configured to enable the scanner device to synchronize a clock included in the scanner device to a clock included in the advertiser device. A scanner device is a BLE-compatible device configured to open a reception window to receive the synchronized event as a result of determining the advertiser device is likely to transmit the synchronized event. For example, the scanner device may be configured to open the reception window as a result of determining a duration has passed since the previous synchronized event. The reception window is configured to be the duration wherein the scanner device may receive the synchronized event, transmitted by the advertiser device. Typically, a scanner device will open the reception window as a result of anticipating the periodic synchronized events.

The advertiser device and scanner device each include a clock to allow for synchronized connectionless communications to be exchanged. BLE communication protocols allow for BLE-compatible devices to use a sleep clock accuracy (SCA) clock or oscillator during intervals of inactivity, such as between periodic anchor events. The SCA clock is configured to reduce the BLE-compatible device power consumption during intervals wherein there are no data packets exchanged between the advertiser device and the scanner device. For example, the scanner device may enable an SCA clock during the intervals between opening and closing the reception window. BLE communication protocols allow for the SCA clock to be less accurate than the clock used during data transmission, such that the SCA clock may have a maximum drift of approximately plus/minus five hundred pulses per minute. Periodic anchor events are configured determine and correct the clock drift resulting from the SCA clock as a result of receiving a synchronized event during an anchor event.

Typically, scanner devices are configured to open the reception window for a duration of time prior to the synchronized event such that the SCA clock drift of the scanner device and advertiser device may occur without effecting the reception of the synchronized event. The interval between opening the reception window and receiving the synchronized event decreases the power efficiency of the scanner device, such that power is consumed increases as the duration between opening the reception window and receiving the synchronized event increases. BLE-compatible devices, which are powered by a battery exhibit shorter battery life as a result of unnecessarily long durations between opening the reception window and receiving the synchronized event.

Examples disclosed herein include BLE-compatible devices that implement an adaptive method to reduce the interval between opening a reception window and receiving a synchronized event during BLE anchor events on a data channel and/or secondary channel. The adaptive method is configured to modify the interval between a scanner device receiving a synchronized event and opening a reception window for the following synchronized event. The adaptive method predicts the SCA clock drift of the advertiser device to accurately predict when to open the reception window to receive the synchronized event. Advantageously, the adaptive method reduces the power consumption of scanner devices as a result of reducing the duration between opening the reception window and receiving the synchronized event.

FIG. 1 is a schematic diagram of an example BLE communication system 100 including an example advertiser device 102 and an example scanner device 104. In the example of FIG. 1, the BLE communication system 100 includes the advertiser device 102 and the scanner device 104. The BLE communication system 100 is configured to implement BLE communication protocols to allow the advertiser device 102 to exchange data with the scanner device 104.

In the example of FIG. 1, the advertiser device 102 includes an example power supply 106, an example first processor circuitry 108, an example first Bluetooth controller 110, an example first SCA clock 112, and an example first antenna 114. The advertiser device 102 is configured to periodically transmit a synchronized event, such that the scanner device 104 may determine a clock drift of the first SCA clock 112. Additionally, the advertiser device 102 may indicate a maximum clock drift of the first SCA clock 112 by transmitting a data packet containing the maximum clock drift to the scanner device 104. The advertiser device 102 is configured to transmit the synchronized event based on BLE communication protocols.

The power supply 106 is coupled to the first processor circuitry 108, the first Bluetooth controller 110, and the first SCA clock 112. The power supply 106 is configured to supply power to the first processor circuitry 108, the first Bluetooth controller 110, and the first SCA clock 112. The power supply 106 may be configured as a current source and/or a voltage supply, such that components may operate at different voltages. For example, the first processor circuitry 108 may be configured to operate at approximately 3.3 volts (V) whereas the first Bluetooth controller 110 may be configured to operate at 1.8 volts (V).

The first processor circuitry 108 is coupled to the power supply 106 and the first Bluetooth controller 110. The first processor circuitry 108 is configured to control the first Bluetooth controller 110, such that the first processor circuitry 108 may transmit and/or receive messages using BLE communication protocol through the first Bluetooth controller 110. For example, the first processor circuitry 108 may transmit data to the scanner device 104 as a result of using inter-integrated circuit (I2C) communication protocols to send the data to the first Bluetooth controller 110. Alternatively, the first processor circuitry 108 may be a microcontroller, a field programmable gate array (FPGA), processing circuitry, etc.

The first Bluetooth controller 110 is coupled to the power supply 106, the first processor circuitry 108, the first SCA clock 112, and the first antenna 114. The first Bluetooth controller 110 includes an example transmitter clock 116. The first Bluetooth controller 110 is configured to implement BLE communication protocols to communicate with the scanner device 104. For example, the first Bluetooth controller 110 may construct a data packet, based on BLE communication protocols, to transmit to the scanner device 104 based on a data exchange with the first processor circuitry 108 using I2C communication protocols. The first Bluetooth controller 110 is configured to periodically transmit a synchronized event to the scanner device 104. For example, the first Bluetooth controller 110 may transmit a data packet every second to enable the scanner device 104 to determine a clock drift since the previous data packet. The first Bluetooth controller 110 is configured to use the first SCA clock 112 during the intervals between synchronized events. The first Bluetooth controller 110 is configured to use the transmitter clock 116 to transmit synchronized events.

The first SCA clock 112 is coupled to the power supply 106 and the first Bluetooth controller 110. The first SCA clock 112 is configured to be used by the first Bluetooth controller 110 to determine a duration from a previous synchronized event, such that the first Bluetooth controller 110 may determine whether or not to transmit a synchronized event. For example, the first Bluetooth controller 110 may be configured to transmit a synchronized event after measuring 500 clock cycles from the first SCA clock 112 with a frequency of 2 millihertz (mH), such that a synchronized event is transmitted approximately every second. Alternatively, the first SCA clock 112 may be replaced with an oscillator, resistor capacitor (RC) oscillator, etc.

The first antenna 114 is coupled to the first Bluetooth controller 110. The first antenna 114 is configured to increase a range that the first Bluetooth controller 110, such that a physical distance between the devices 102 and 104 may be increased. The first antenna 114 may be configured to impedance match the first Bluetooth controller 110, such that the first antenna 114 may maximize the power supplied by the first Bluetooth controller 110.

In the example of FIG. 1, the scanner device 104 includes an example battery 120, a second processor circuitry 122, a second Bluetooth controller 124, a second SCA clock 126, and a second antenna 128. The scanner device 104 is configured to be communicatively coupled to the advertiser device 102 through BLE communication protocols. The scanner device 104 is configured to open a reception window wherein the scanner device 104 may receive the synchronized event generated by the advertiser device 102. Additionally, the scanner device 104 is configured to determine the maximum clock drift of the first SCA clock 112 as a result of receiving a data packet indicating the maximum clock drift from the advertiser device 102.

The battery 120 is coupled to the second processor circuitry 122, the second Bluetooth controller 124, and the second SCA clock 126. The battery 120 is configured to supply power to the second processor circuitry 122, the second Bluetooth controller 124, and the second SCA clock 126. The battery 120 may be configured as a current source and/or a voltage supply. For example, the second processor circuitry 122 may be configured to operate at approximately 3.3 volts (V) whereas the second Bluetooth controller 124 may be configured to operate as a result of being supplied 200 milliamps (mA). Alternatively, the battery 120 may be a power supply (such as the power supply 106). Advantageously, the battery 120 enables the scanner device 104 to be a mobile device, such as headphones, a remote, a smart device, etc.

The second processor circuitry 122 is coupled to the battery 120 and the second Bluetooth controller 124. The second processor circuitry 122 is configured to control the second Bluetooth controller 124, such that the second processor circuitry 122 may transmit and/or receive messages using BLE communication protocol through the second Bluetooth controller 124. For example, the second processor circuitry 122 may transmit data to the advertiser device 102 as a result of using inter-integrated circuit (I2C) communication protocols to send the data to the second Bluetooth controller 124. Alternatively, the second processor circuitry 122 may be a microcontroller, a field programmable gate array (FPGA), processing circuitry, etc.

The second Bluetooth controller 124 is coupled to the battery 120, the second processor circuitry 122, the second SCA clock 126, and the second antenna 128. The second Bluetooth controller 124 includes an example receiver clock 132. The second Bluetooth controller 124 is configured to implement BLE communication protocols to communicate with the advertiser device 102. For example, the second Bluetooth controller 124 may receive one or more data packets, based on BLE communication protocols, from the advertiser device 102. The second Bluetooth controller 124 may be configured to synchronize the transmitter clock 116 and the receiver clock 132 as a result of receiving a transmission from the advertiser device 102. For example, the scanner device 104 configures the receiver clock 132 to be synchronized with the transmitter clock 116 as a result of receiving one or more data packets corresponding to a synchronized event. The second Bluetooth controller 124 is configured to open a reception window to receive a synchronized event from the advertiser device 102. The second Bluetooth controller 124 is configured to close the reception window as a result of either receiving a synchronized event or being open for a duration greater than a threshold. The second Bluetooth controller 124 may be configured to determine an interval between reception windows based on an interval between synchronized events. For example, the second Bluetooth controller 124 may open the reception window half a second after receiving a synchronized event from the advertiser device 102, such that the second Bluetooth controller 124 may receive synchronized events every half second or longer. The second Bluetooth controller 124 may be configured to receive a data packet, from the advertiser device 102, indicating the interval between synchronized events. The second Bluetooth controller 124 is configured to use the second SCA clock 126 during the intervals between opening the reception window, such that the receiver clock 132 is used during the durations the reception window is open.

The second SCA clock 126 is coupled to the battery 120 and the second Bluetooth controller 124. The second SCA clock 126 is configured to be used by the second Bluetooth controller 124 to determine a duration from a previous synchronized event, such that the second Bluetooth controller 124 may determine whether or not to open the reception window to receive a synchronized event. For example, the second Bluetooth controller 124 may be configured to open a reception window after measuring 500 clock cycles from the second SCA clock 126 with a frequency of 2 millihertz (mH), such that the reception window is opened after approximately one second. Alternatively, the second SCA clock 126 may be replaced with a crystal oscillator, resistor capacitor (RC) oscillator, etc.

The second antenna 128 is coupled to the second Bluetooth controller 124. The second antenna 128 is configured to increase a range that the second Bluetooth controller 124, such that a physical distance between the devices 102 and 104 may be increased. The second antenna 128 may be configured to impedance match the second Bluetooth controller 124, such that the second antenna 128 may maximize the power supplied by the second Bluetooth controller 124.

In example operation, the advertiser device 102 and the scanner device 104 are communicatively coupled using a process determined by BLE communication protocols. The first processor circuitry 108 is configured to communicate with the first Bluetooth controller 110, such as to transmit data to the scanner device 104. The first Bluetooth controller 110 is configured to periodically transmit a synchronized event to the scanner device 104. The first Bluetooth controller 110 is configured to use the first SCA clock 112 during the interval between synchronized events to determine whether or not enough time has passed to transmit another synchronized event. Advantageously, the power efficiency of the advertiser device 102 is increased as a result of using the first SCA clock 112 to determine when to transmit a synchronized event.

In example operation, the second processor circuitry 122 is configured to communicate with the second Bluetooth controller 124 to receive data from the advertiser device 102. The second Bluetooth controller 124 is configured to synchronize the receiver clock 132 as a result of receiving a data packet from the advertiser device 102. The second Bluetooth controller 124 is configured to open a reception window as a result of anticipating a synchronized event is to be transmitted by the advertiser device 102. For example, the second Bluetooth controller 124 may open the reception window 100 microseconds (µS) prior to the potential synchronized event being transmitted by the advertiser device 102. Additionally, the second Bluetooth controller 124 is configured to keep the reception window open until a synchronized event is received or the duration since the reception was opened exceeds a threshold. The second Bluetooth controller 124 may be configured to measure the duration between opening the reception window and receiving the synchronized event. The second processor circuitry 122 is configured to determine an interval to wait before opening the reception window for another synchronized event based on the measured duration between opening the reception window and receiving the synchronized event. The second Bluetooth controller 124 is configured to use the second SCA clock 126 between reception windows.

Advantageously, the power efficiency of the scanner device 104 is increased as a result of the second Bluetooth controller 124 using the second SCA clock 126 to determine whether or not the interval, determined by the second processing circuitry 122, has passed to open the reception window. Advantageously, the interval between opening reception windows may be modified to decrease the power consumption during the durations wherein the reception window is open and waiting for a synchronized event.

Figure 2:
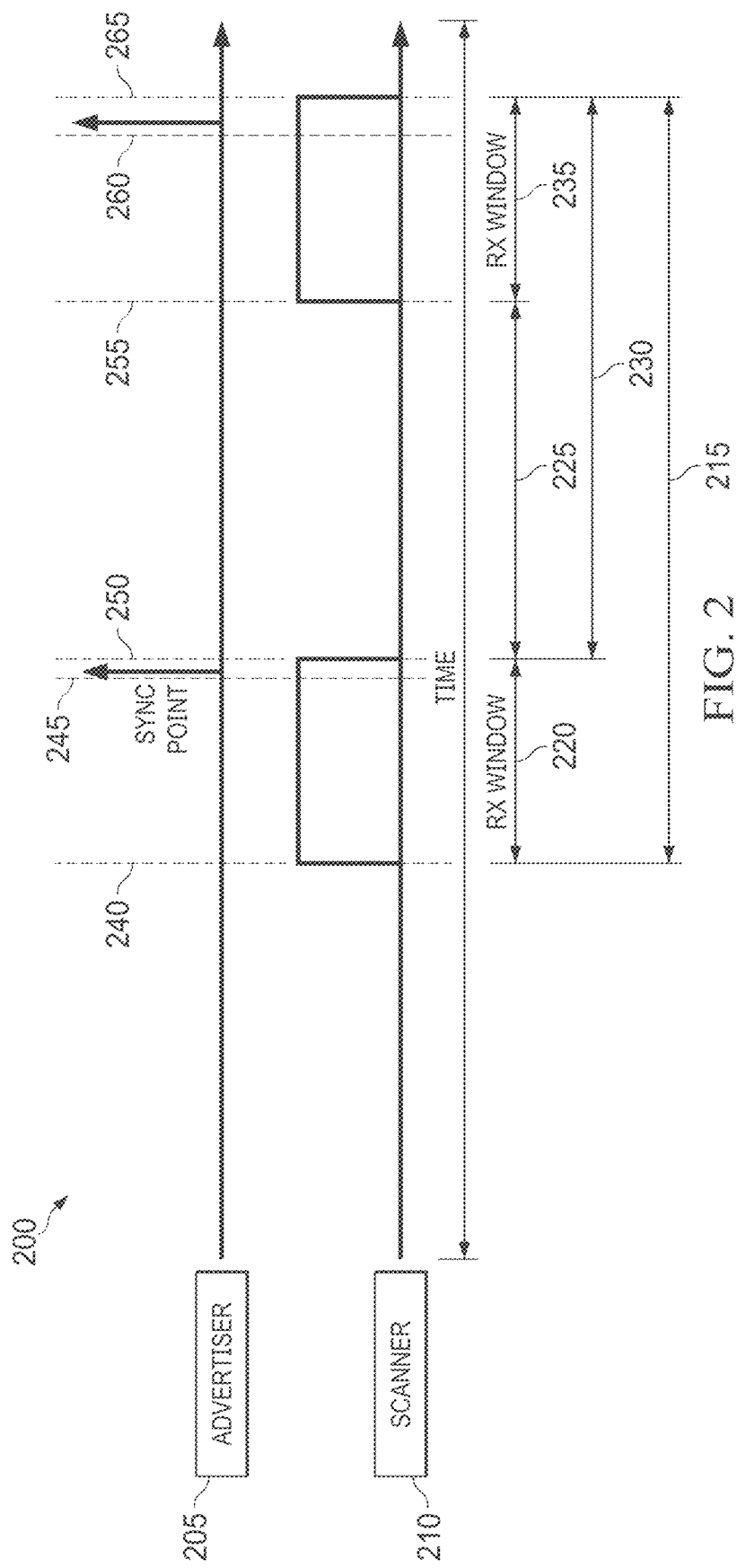
FIG. 2 is a timing diagram of an example operation of the BLE communication system of FIG. 1 including a periodic advertising exchange.

FIG. 2 is a timing diagram 200 of an example operation of the BLE communication system 100 of FIG. 1. In the example of FIG. 2, the timing diagram 200 includes an example advertiser device operation 205, an example scanner device operation 210, and a periodic advertising exchange 215. The timing diagram 200 is configured to illustrate the periodic advertising exchange 215 between the advertiser device 102 of FIG. 1 and the scanner device 104 of FIG. 1 to synchronize BLE communications.

In the example of FIG. 2, the advertiser device operation 205 is configured to illustrate the operation of the advertiser device 102. The advertiser device operation 205 is configured to represent a transmission of a synchronized event as a value greater than common potential (e.g., ground). For example, the advertiser device operation 205 transitions from a logic low to a logic high to indicate the transmission of a synchronized event. The scanner device operation 210 is configured to illustrate the operation of the scanner device 104. The scanner device operation 210 is configured to represent a reception window as a value greater than common potential for a duration of time. For example, the scanner device operation 210 transitions to a logic high to indicate the opening of a reception window. In such an example, the scanner device operation 210 may transition from a logic high to a logic low to indicate closing the reception window.

In the example of FIG. 2, the periodic advertising exchange 215 includes an example first BLE anchor event 220, an example reception interval 225, an example advertisement interval 230, and a second BLE anchor event 235. In the example of FIG. 2, the periodic advertising exchange 215 is configured to illustrate periodic BLE anchor events (e.g., the BLE anchor events 220 and 235).

In the example of FIG. 2, the first BLE anchor event 220 is configured to represent a reception window opening and closing based on a synchronized event. The first BLE anchor event 220 begins at a first time 240, wherein the scanner device operation 210 transitions from a logic low to a logic high, such that the scanner device 104 opens a reception window. The first time is determined based on the scanner device 104 anticipating a synchronized event with a potential clock drift equal to a maximum clock drift. The maximum clock drift may be based on a value indicated in a previous data transmission between the advertiser device 102 and the scanner device 104. At a second time 245, the advertiser device operation 205 transitions from a logic low to a logic high to indicate a synchronized event being transmitted by the advertiser device 102. The first BLE anchor event 220 ends at a third time 250, the scanner device operation 210 transitions from a logic high to a logic low to indicate the scanner device 104 closing the reception window, opened at the first time 240, as a result of receiving the synchronized point, generated at the second time 245. The duration of the first BLE anchor event 220 is based upon the duration the scanner device has the reception window is open.

The reception interval 225 is configured to immediately proceed the first BLE anchor event 220, such that the reception interval 225 begins at the third time 250. The reception interval 225 is configured to end at a fourth time 255 wherein the scanner device operation 210 transitions from a logic low to a logic high to indicate opening a reception window, such that the reception interval 225 has a duration of the difference between the times 250 and 255. The reception interval 225 is configured to represent the duration of time wherein the Bluetooth controllers 110 and 124 of FIG. 1 are configured to use the SCA clocks 112 and 126 of FIG. 1. The reception interval 225 may be modified to adjust for a clock drift, such that a reception window corresponding to the second BLE anchor event is opened prior to a time wherein the clock drift may cause the synchronized event to be received. For example, the reception interval may be opened for a duration less than or equal to a maximum clock drift such that the synchronized event is likely to be received.

At the third time 250, the reception interval 225 begins as a result of the end of the first BLE anchor event 220. The duration of the reception interval 225 may be based on the duration between the first time 240 and the second time 245, such that the duration of the reception interval 225 may be increased or decreased based on the difference between the times 240 and 245. For example, the second processer circuitry 122 of FIG. 1 may configure the second Bluetooth controller 124 to increase the duration of the reception interval 225 based on determining the difference between the times 240 and 245 being greater than a threshold, such that the scanner device 104 may open the reception window to decrease the duration between opening the reception window and receiving the synchronized event. Advantageously, the duration of the reception interval 225 may be modified to decrease the duration between the scanner device 104 opening the reception window and receiving a synchronized event.

The advertisement interval 230 is configured to immediately proceed the second time 245, such that the advertisement interval 230 begins as a result of the synchronized event at the second time 245. The advertisement interval 230 is the interval between the transmission of synchronized events. The advertisement interval 230 ends at a fifth time 260, such that the advertisement interval 230 has a duration approximately equal to the difference between the times 245 and 260. The duration of the advertisement interval 230 may be configured based on BLE communication protocols. Advantageously, the scanner device 104 may determine a clock drift of the advertiser device 102 based on the difference between the duration of the advertisement interval 230 and the BLE communication protocol specified advertisement interval duration.

The second BLE anchor event 235 is configured to immediately follow the reception interval 225, such that the scanner device 104 opens the reception window as a result of the end of the reception interval at the fourth time 255. The second BLE anchor event 235 is configured to begin at the fourth time 255. At the fourth time 255, the scanner device operation 210 transitions from a logic low to a logic high to indicate opening a reception window. At the fifth time 260, the advertiser device operation 205 transitions from a logic low to a logic high to indicate a synchronized event transmission. At a sixth time 265, the scanner device operation 210 transitions from a logic high to a logic low to indicate closing the reception window as a result of receiving the synchronized event, generated at the fifth time 260. Advantageously, the duration between opening the reception window, at the fourth time 255 and receiving the synchronized event at the sixth time 265 may be decreased by increasing the reception interval 225.

Figure 3:
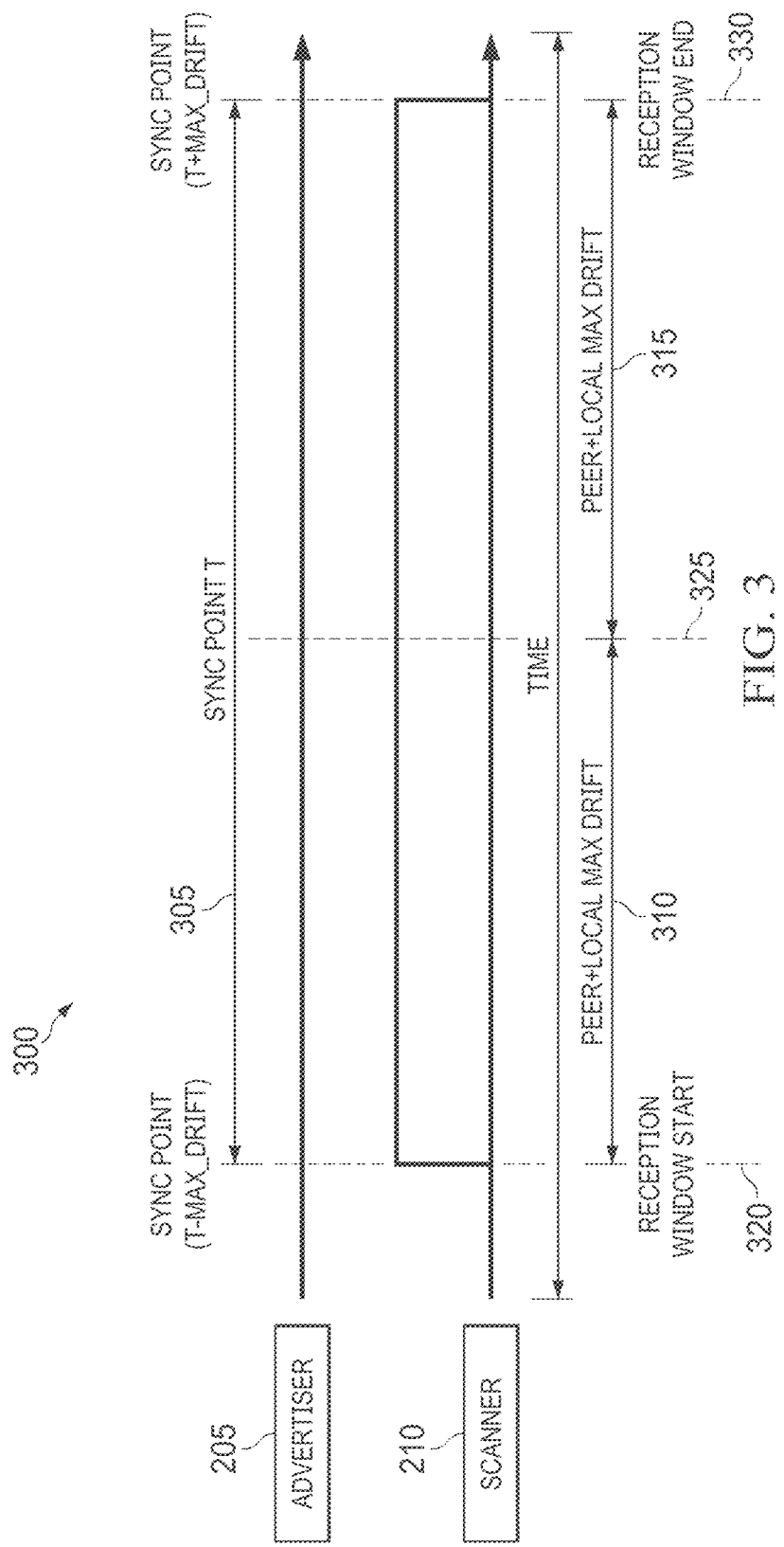
FIG. 3 is a timing diagram of an example operation of the BLE communication system of FIG. 1 including a maximum reception window duration.

FIG. 3 is a timing diagram 300 of an example operation of the BLE communication system 100 of FIG. 1 including a maximum reception window duration 305. In the example of FIG. 3, the timing diagram 300 includes the advertiser device operation 205 and the scanner device operation 210, the maximum reception window duration 305, an example maximum negative drift duration 310, and an example maximum positive drift duration 315. The timing diagram 300 is configured to illustrate a maximum duration wherein the scanner device 104 of FIG. 1 may have the reception window open, such as during the BLE anchor events 220 and 235 of FIG. 2.

In the example of FIG. 3, the maximum reception window duration 305 is approximately equal to the maximum negative drift duration 310 plus the maximum positive drift duration 315. The maximum reception window duration 305 begins at a first time 320. The maximum reception window duration 305 is configured to represent the maximum about of time that the scanner device 104 may have a reception window open, such that the scanner device operation 210 transitions to a logic high at the first time 320 to indicate opening the reception window. The maximum reception window duration 305 is based on a clock drift of the advertiser device 102 of FIG. 2 and/or scanner device 104. For example, the maximum reception window duration 305 increases as a clock drift of the first SCA clock 112 of FIG. 1 increases. Advantageously, the maximum reception window duration 305 may be determined based on the clock drift of the SCA clock 112 and/or 126 of FIG. 1.

The maximum negative drift duration 310 begins at the first time 320. The maximum negative drift duration 310 ends at a second time 325, such that the difference between the times 320 and 325 is approximately equal to a maximum clock drift of the SCA clock 112 and/or 126. The duration of the maximum negative drift duration 310 is based on the maximum clock drift of an SCA clock included in the advertiser device 102 and/or the scanner device 104. For example, the maximum negative drift duration 310 may be equal to the maximum drift of the first SCA clock 112. The second time 325 is configured to be a predicted time wherein the scanner device 104 anticipates a synchronized event to be sent by the advertiser device 102. For example, the second time 325 is determined as a result of the duration since the previous synchronized event being approximately (preferably exactly) equal to the duration of the advertisement interval 230. The maximum negative drift duration 310 is configured to illustrate the potential duration before the anticipated synchronized event, at the second time 325, wherein a synchronized event may be received due to clock drift.

The maximum positive drift duration 315 begins at the second time 325, such that the maximum positive drift duration 315 represents a duration following the anticipated synchronized event, at the second time 325, wherein the synchronized event may be received as a result of clock drift. The maximum positive drift duration 315 ends at a third time 330. The duration of the maximum positive drift duration 315 is approximately equal to the duration of the maximum negative drift duration 310. The maximum positive drift duration 315 is configured to immediately follow the anticipated synchronized event, at the second time 325, such that duration of the maximum negative drift duration 310 plus the duration of the maximum positive drift duration 315 is approximately equal to the maximum reception window duration 305. Advantageously, the maximum reception window duration 305 may be determined based on the clock drift of the SCA clock.

Figure 4:
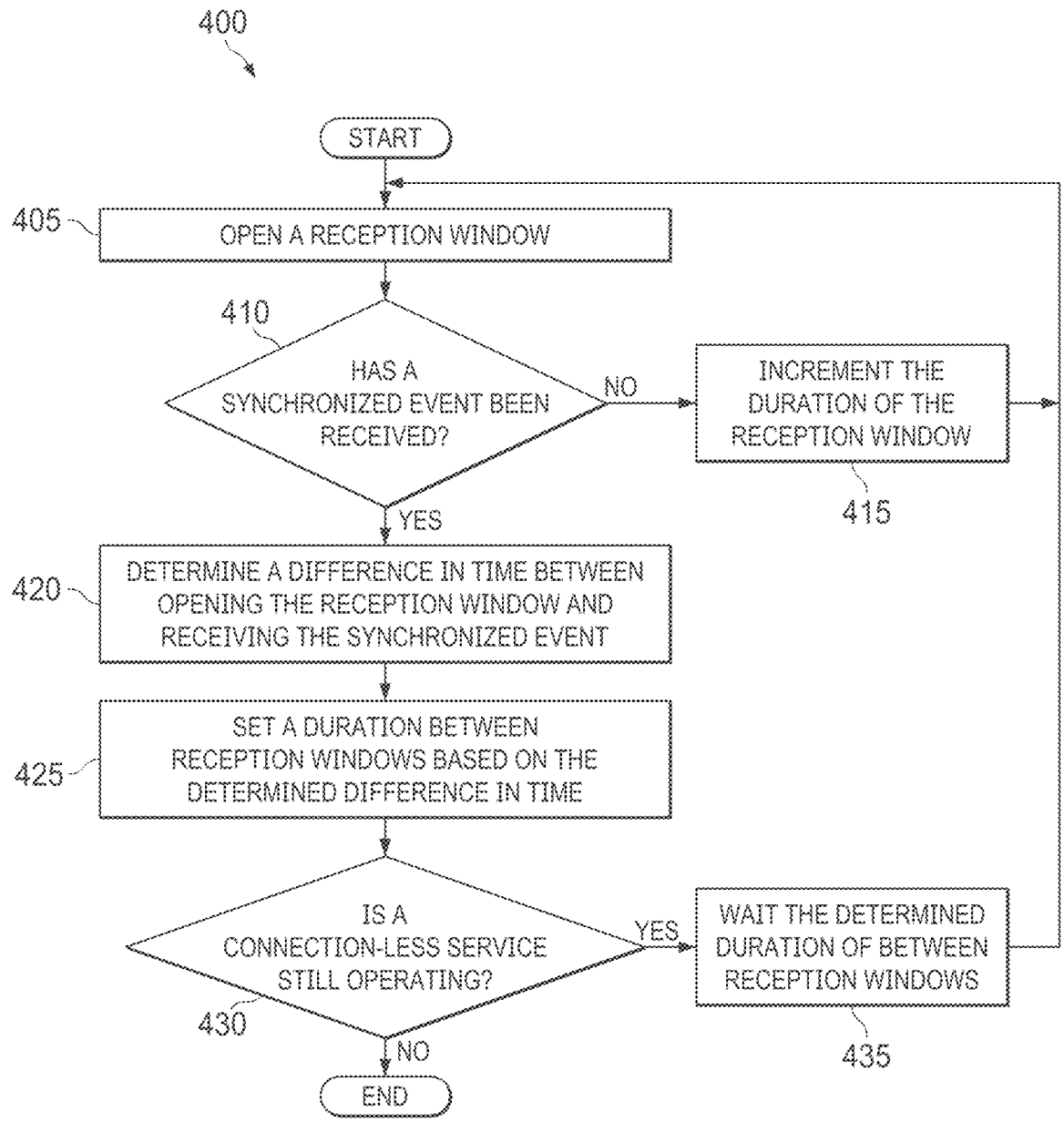
FIG. 4 is a flowchart representative of an example process that may be performed using machine readable instructions that can be executed and/or hardware configured to implement the scanner device of FIG. 1, and more generally, to improve the periodic advertising exchange of FIG. 2.

FIG. 4 is a flowchart 400 representative of an example process that may be performed using machine readable instructions that can be executed and/or hardware configured to implement the scanner device 104 of FIG. 1, and more generally, to optimize the periodic advertising exchange 215 of FIG. 2. The machine-readable instructions of the flowchart 400 begin at block 405, at which the second Bluetooth controller 124 of FIG. 1 opens a reception window. For example, the second Bluetooth controller 124 opens a reception window at the times 240 and 255 of FIG. 2 to begin the BLE anchor events 220 and 235 of FIG. 2. At block 405, the second Bluetooth controller 124 opens the reception window as a result of the scanner device 104 predicting a synchronized event. At block 405, the second Bluetooth controller 124 may open the reception window to account for the maximum negative drift duration 310 of FIG. 3. The second Bluetooth controller 124 proceeds to block 410.

At block 410, the second Bluetooth controller 124 determines whether or not a synchronized event has been received. At block 410, the second Bluetooth controller 124 is configured to determine whether or not the advertiser device 102 has transmitted a synchronized event since opening the reception window. The second Bluetooth controller 124 proceeds to block 415 as a result of determining no synchronized event has been received from the advertiser device 102.

At block 415, the second Bluetooth controller 124 increments the duration of the reception window. At block 415, the second Bluetooth controller 124 increases the duration of the reception window, such that a synchronized event may be received. At block 415, the second Bluetooth controller 124 may be configured to limit the length of the reception window to a value representative of a maximum clock drift. The second Bluetooth controller 124 proceeds to block 405. For example, the reception windows opened for BLE anchor events 220 and 235 remain open until a synchronized event is received. The second Bluetooth controller 124 proceeds to block 420 as a result of receiving a synchronized event.

At block 420, the second Bluetooth controller 124 determines the difference in time between opening the reception window and receiving the synchronized event. At block 420, the second Bluetooth controller 124 is configured to determine the duration between opening the reception window, at block 405, and receiving a synchronized event, at block 410. For example, the duration determined at block 420 is equal to the difference between times 240 and 245 of FIG. 2. The duration determined at block 420 represents the portion of the reception window which may be reduced to decrease power consumption. The second Bluetooth controller 124 proceeds to block 425.

At block 425, the second Bluetooth controller 124 sets a duration between reception windows based on the determined difference in time. For example, the second Bluetooth controller 124 may reduce the duration between reception windows based on the difference in time measured over a plurality of BLE anchor events (e.g., the BLE anchor events 220 and 235 of FIG. 2). In some such examples, the duration between reception windows may be determined based on an average of a plurality of determined difference in times. At block 425, the second Bluetooth controller 124 is configured to modify a duration between reception windows to reduce the duration between opening the reception window, at block 405, and receiving the synchronized event, at block 410. For example, the second Bluetooth controller 124 may increase the reception interval 225 as a result of the determined duration from block 420 being greater than a threshold duration. Alternatively, at block 425, the second Bluetooth controller 124 may limit the reception interval 225 based on the maximum negative drift duration 310 and the maximum positive drift duration 315. Advantageously, the power consumed by the scanner device 104 during a BLE anchor event (e.g., the BLE anchor events 220 and 235) is reduced as a result of reducing the duration between opening the reception window and receiving the synchronized event. The second Bluetooth controller 124 proceeds to block 430.

At block 430, the second Bluetooth controller 124 determines whether or not there is a connectionless service still operating. In the example of FIG. 3, the connectionless service is configured to represent the communication across the BLE communication system 100 of FIG. 1. At block 430, the second Bluetooth controller 124 is configured to determine whether the advertiser device 102 is communicatively coupled to the scanner device 104, such that BLE communication protocols may be implemented for connectionless communication. The process represented by flowchart 400 ends after block 430 as a result of the second Bluetooth controller 124 determining the advertiser device 102 and the scanner device 104 are not communicatively coupled. The second Bluetooth controller 124 proceeds to block 435 as the result of the second Bluetooth controller 124 determining the devices 102 and 104 are communicatively coupled at block 430.

At block 435, the second Bluetooth controller 124 waits the determined duration between reception windows. At block 435 the second Bluetooth controller 124 is configured to wait the duration determined at block 425 before proceeding to block 405. For example, the second Bluetooth controller 124 is configured to wait the reception interval 225 prior to opening the reception window at the fourth time 255 of FIG. 2. Advantageously, the duration between reception windows may be modified to decrease the duration wherein the reception window is open and waiting for a synchronized event.

Although example methods are described with reference to the flowchart 400 illustrated in FIG. 4, many other methods of optimizing the duration of a reception window in a connectionless service may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 5:
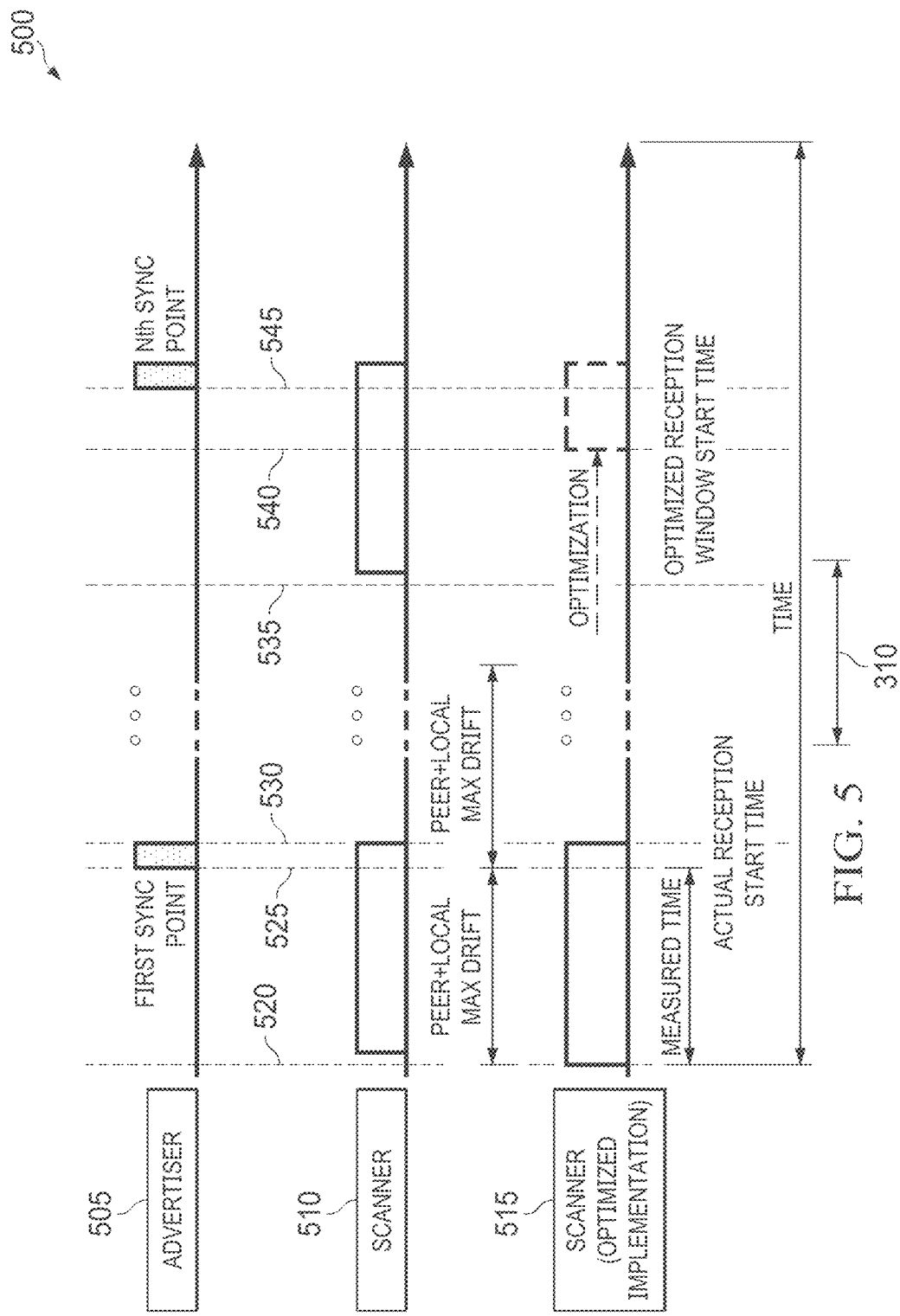
FIG. 5 is a timing diagram of an example operation of the BLE communication system of FIG. 1 including a measured interval to improve the periodic advertising exchange of FIG. 2 using the process of FIG. 4.

FIG. 5 is a timing diagram 500 of an example operation of the BLE communication system 100 of FIG. 1 configured to implement the process of FIG. 4. In the example of FIG. 5, the timing diagram 500 includes an example advertiser operation 505, an example scanner operation 510, and an example optimized scanner operation 515. The timing diagram 500 is configured to represent the machine-readable instructions of the flowchart 400 of FIG. 4 to optimize reception window duration.

In the example of FIG. 5, the advertiser operation 505 illustrates the operation of the advertiser device 102 of FIG. 1. The advertiser operation 505 represents a transmission of a synchronized event as a value greater than common potential (e.g., ground). For example, the advertiser operation 505 transitions from a logic low to a logic high to indicate the transmission of a synchronized event. The scanner operation 510 illustrates the operation of the scanner device 104 of FIG. 1. The scanner operation 510 represents a maximum reception window as a value greater than common potential for a duration of time, such that the scanner device 104 may receive a synchronized event even with a maximum clock drift. For example, the scanner operation 510 transitions to a logic high to indicate the opening of a reception window. In such an example, the scanner operation 510 may transition from a logic high to a logic low to indicate closing the reception window.

The optimized scanner operation 515 illustrates the operation of the scanner device 104 configured to implement the process of FIG. 4, such that the duration of the reception window is based on a previous synchronized event. For example, the second Bluetooth controller 124 of FIG. 1 increases the duration between reception windows to reduce the duration between opening a reception window and receiving a synchronized event. Advantageously, the process of FIG. 4 may be repeated to create an adaptive reception window.

At a first example time 520, the scanner operation 510 and the optimized scanner operation 515 transition from a logic low to a logic high to indicate opening a reception window. At a second time 525, the advertiser operation 505 transitions from a logic low to a logic high to indicate a synchronized event. The interval between the first time 520 and the second time 525 is the time determined at block 420 of FIG. 4.

At a third time 530, the advertiser operation 505, the scanner operation 510, and the optimized scanner operation 515 transition from a logic high to a logic low. At the third time 530 the advertiser operation 505 completes transmission of a data packet corresponding to a synchronized event. At the third time 530, the scanner operation 510 and the optimized scanner operation 515 close the reception window, opened at the first time 520. The advertiser operation 505 is configured to periodically transmit a data packet corresponding to a synchronized event, such that the scanner operation 510 and the optimized scanner operation 515 are configured to periodically open a reception window. Advantageously, the optimized scanner operation 515 increases the duration between reception windows to decrease the duration between opening a reception window and receiving the data packet corresponding to a synchronized event.

At a fourth time 535, the scanner operation 510 transitions from a logic low to a logic high to indicate opening a reception window. At a fifth time 540, the optimized scanner operation 515 transitions from a logic low to a logic high to indicate opening a reception window. At a sixth time 545, the advertiser operation transitions from a logic low to a logic high to indicate transmission of a data packet corresponding to a synchronized event. The duration between time 535 and 545 is a reference duration based on opening the reception window to account for a maximum negative drift duration (e.g., the maximum negative drift duration 310 of FIG. 3). The duration between time 540 and 545 is the result of modifying the duration between reception windows, such as at block 425 of FIG. 4. Advantageously, the machine-readable instructions of the flowchart 400 reduce the duration between opening a reception window and receiving a synchronized event. Advantageously, the machine-readable instructions of the flowchart 400 reduce the power consumption of the scanner device 104.

Figure 6:
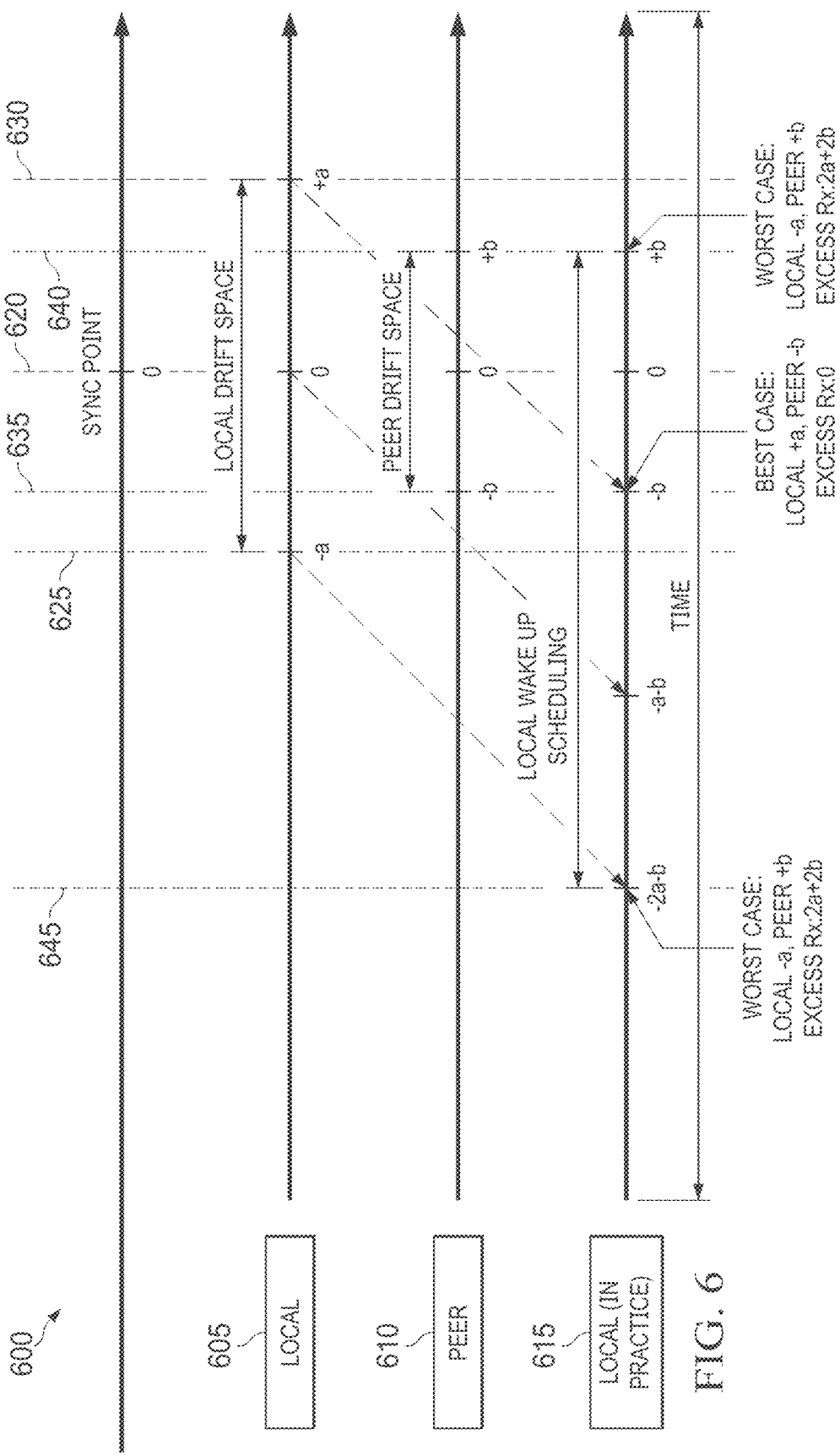
FIG. 6 is a diagram of possible values of the clock drift of the advertiser device and the scanner device of FIG. 1.

FIG. 6 is a diagram 600 of possible values of the clock drift of the advertiser device 102 of FIG. 1 and/or the scanner device 104 of FIG. 1. In the example of FIG. 6, the diagram 600 includes an example scanner drift (Local) 605, an example advertiser (Peer) drift 610, and an example determined scanner drift (Local (in practice)) 615. The diagram 600 illustrates the possible clock drift values based on the individual clock drift of each of the devices 102 and 104.

In the example of FIG. 6, the scanner drift 605 illustrates possible clock drift values of the second SCA clock 126 of FIG. 1. The advertiser drift 610 illustrates possible clock drift values of the first SCA clock 112 of FIG. 1. The determined scanner drift 615 illustrates the possible clock drift values wherein the scanner device 104 may receive a synchronized event, such that the clock drifts of both the advertiser device and scanner device are included.

At a first time 620, the synchronized event is intended to be transmitted by the advertiser device. As represented by the scanner drift 605, the scanner device 104 may receive the synchronized event between a second time 625 and a third time 630, such that the first time 620 is between the times 625 and 630. The duration between the first time 620 and the second time 625 illustrates possible negative clock drift values (e.g., a portion of the maximum negative drift duration 310 of FIG. 3) as a result of the clock of the scanner device 104. The difference between the times 620 and 625 is approximately equal to the difference between the times 620 and 630, such that the first time 620 is in between the times 625 and 630.

As illustrated by the advertiser drift 610, the advertiser device 102 may transmit the synchronized event between a fourth time 635 and a fifth time 640, such that the first time 620 is between the times 635 and 640. The duration between the first time 620 and the fourth time 635 illustrates possible negative clock drift values compared to the clock of the scanner device 104. The difference between the times 620 and 635 is approximately equal to the difference between the times 620 and 640, such that the first time 620 is in between the times 635 and 640.

The determined scanner drift 615 may cause the synchronized event, intended for the first time 620, to be received between the fifth time 640 and a sixth time 645. The determined scanner drift 615 illustrates that the scanner device 104 may receive the synchronized event at the sixth time 645 as the result of the clock drifts of both the scanner drift 605 and the advertiser drift 610. Advantageously, the process of FIG. 4 may reduce the power consumption resulting from the possible range of the scanner device 104 receiving the synchronized event.

FIG. 7A is a table 700 of an example operation of the BLE communication system 100 of FIG. 1 with and without the optimization process of FIG. 4. In the example of FIG. 7A, the table 700 includes an example low frequency (LF) clock source column 705, an example optimization column 710, an example power consumption column 715, an example first operation row 720, a second operation row 725, and a third operation row 730. The table 700 illustrates measured reductions in power consumption as a result of implementing the process of FIG. 4.

In the example of FIG. 7A, the LF clock source column 705 is configured to represent the low frequency clock used as the second SCA clock 126 of FIG. 1. For example, the second SCA clock 126 may be an internal resistor-capacitor oscillator (RCOSC) or coupled to an external clock source (XTAL). The optimization column 710 indicates whether or not the optimization process of FIG. 4 was implemented. The power consumption column 715 represents the power consumption of the LF clock implemented with or without the optimization of FIG. 4.

The first operation row 720 represents the operation of an external clock without the optimization of FIG. 4 based on the LF clock source column 705 and the optimization column 710. The power consumption column 715 indicates that the power consumption of the external oscillator without the optimization of FIG. 4 is approximately equal to 9.2 microamps (μA).

The second operation row 725 represents the operation of an internal RCOSC without the optimization of FIG. 4 based on the LF clock source column 705 and the optimization column 710. The power consumption column 715 indicates that the power consumption of the internal RCOSC without the optimization of FIG. 4 is approximately 14.4 microamps (μA).

The third operation row 730 represents the operation of an internal RCOSC with the optimization of FIG. 4 based on the LF clock source column 705 and the optimization column 710. The power consumption column 715 indicates that the power consumption of the internal RCOSC with the optimization of FIG. 4 is approximately equal to 11 microamps (μA). Advantageously, the power consumption of an internal RCOSC is reduced by the optimization of FIG. 4. Advantageously, the internal RCOSC with the optimization of FIG. 4 reduces the gap in power consumption between lower cost clocks and complex external clocks.

FIG. 7B is a table 735 of an example operation of the BLE communication system 100 of FIG. 1 including the optimization process of FIG. 4. In the example of FIG. 7B the table 735 includes an example local drift column 740, an example peer drift column 745, an example power consumption column 750, an example first operation row 755, a second operation row 760, and a third operation row 765. The table 735 represents the possible reduction in power consumption as a result of the process of FIG. 4.

The local drift column 740 represents the maximum clock drift of the scanner device 104 of FIG. 1 in plus or minus pulse per minute (+/−ppm). The peer drift column 745 represents the maximum clock drift of the advertiser device 102 of FIG. 1 in plus or minus pulse per minute (+/−ppm). The power consumption column 750 represents the difference in power consumption with and with the process of FIG. 4.

The first operation row 755 represents the operation of a 32 kilohertz (Khz) clock as the SCA clocks 112 and 126 based on the columns 740 and 745. The local drift of the 32 kilohertz (Khz) clock is approximately 40 plus or minus pulse per minute (+/−ppm). The power consumption column 750 indicates that in an example BLE communication system (such as the BLE communication system 100) including 32 Khz clocks as the SCA clocks, the power consumption is reduced from approximately 9.2 microamps (μA) to 7.9 microamps (μA) as a result of implementing the process of FIG. 4.

The second operation row 760 represents the operation of a RCOSC clock with a local drift approximately equal to 500 plus or minus pulse per minute (+/−ppm) as the second SCA clock 126 of the scanner device 104 of FIG. 1 based on the local drift column 740. The second operation row 760 represents the operation of a 32 kilohertz (Khz) clock with a peer drift approximately equal to 40 plus or minus pulse per minute (+/−ppm) as the first SCA clock 112 of the advertiser device 102 of FIG. 1 based on the peer drift column 745. The power consumption column 750 indicates that BLE communication systems configured for the operation of the second operation row 760 power consumption decreases from approximately 14.4 microamps to approximately 11 microamps as a result of implementing the process of FIG. 4. Advantageously, the process of FIG. 4 reduces the power consumption by approximately 24 percent.

The third operation row 765 represents the operation of a RCOSC clock as the SCA clocks 112 and 126 based on the columns 740 and 745. The local drift of the RCOSC clock is approximately 500 plus or minus pulse per minute (+/−ppm). The power consumption column 750 indicates that the BLE communication system including RCOSC clocks as the SCA clocks, the power consumption is reduced from approximately 17.4 microamps (μA) to approximately 11 microamps (μA) as a result of implementing the process of FIG. 4. Advantageously, the process of FIG. 4 reduces the power consumption by approximately 37 percent.

Figure 8:
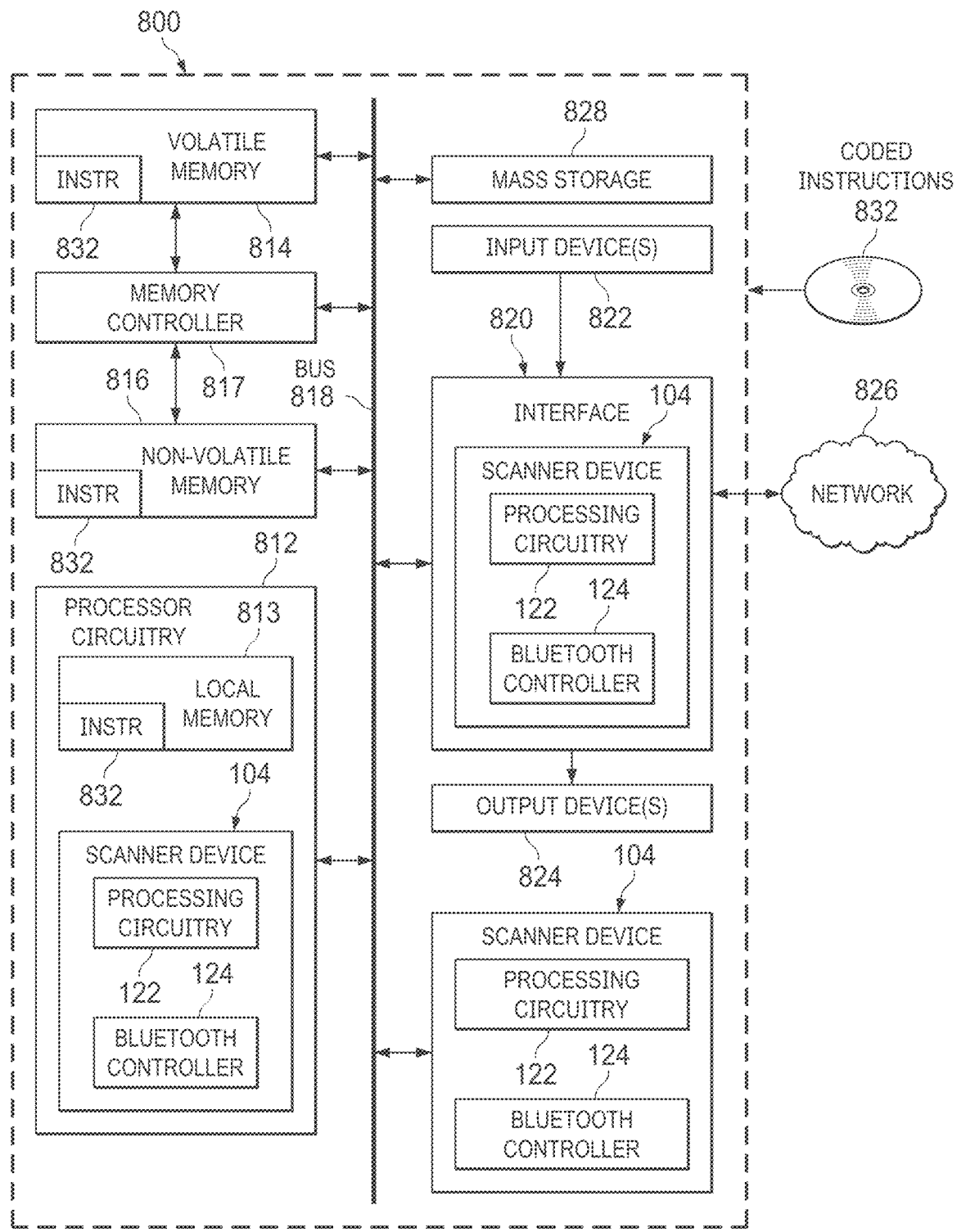
FIG. 8 is a block diagram of an example processing platform including processor circuitry structured to execute the example machine readable instructions and/or the example operations of FIG. 4 to implement the BLE communication system of FIG. 1.

FIG. 8 is a block diagram of an example processing platform including processor circuitry structured to execute the example machine readable instructions and/or the example operations of FIG. 4 to implement the BLE communication system 100 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAS, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the scanner device 104 of FIG. 1 including the second processor circuitry 122 and the second Bluetooth controller 124 of FIG. 1. Alternatively, the processor circuitry 812 may include one or more components of the scanner device 104 and/or the advertiser device 102 of FIG. 1.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random-Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. The interface circuitry 820 may be configured to include the scanner device 104 including the second processor circuitry 122 and the second Bluetooth controller 124. Alternatively, the interface circuitry 820 may include one or more components of the scanner device 104 and/or the advertiser device 102. Additionally, one or more components of the scanner device 104 and/or the advertiser device 102 may be coupled to the bus 818.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine-readable instructions of FIG. 4, may be stored in the mass storage device 828, in the volatile memory 814, in the non-volatile memory 816, and/or on a removable non-transitory computer readable storage medium such as a CD or DVD.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. [figure nos.] may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. An electronic device comprising:
   a transceiver; and
   a controller configured to:
      open a first reception window having a first duration;
      in response to determining that a synchronized transmission has not been received via the transceiver during the first reception window, determine a second duration that is longer than the first duration;
      close the first reception window;
      open a second reception window having the second duration;
      in response to receiving a first synchronized transmission during the second reception window, determine a third duration based on a time difference between opening the second reception window and reception of the first synchronized transmission;
      close the second reception window; and
      open a third reception window having the third duration.

2. The electronic device of claim 1, wherein the second duration represents a maximum clock drift between the electronic device and a wireless device.

3. The electronic device of claim 2, wherein the controller is configured to:
   receive, via the transceiver, a data packet indicative of the maximum clock drift of the wireless device; and
   determine the second duration based on the data packet.

4. The electronic device of claim 2, further comprising an oscillator, wherein the maximum clock drift between the electronic device and the wireless device is based on a drift of the oscillator.

5. The electronic device of claim 1, wherein the third duration is shorter than the second duration.

6. The electronic device of claim 1, wherein the first synchronized transmission is an advertisement.

7. The electronic device of claim 1, further comprising a clock generator configured to generate a clock signal, wherein the controller is configured to open the first, second, and third reception windows based on the clock signal.

8. The electronic device of claim 1, further comprising a first clock generator configured to generate a first clock signal, and a second clock generator configured to generate a second clock signal, wherein the controller is configured to use the first clock signal during intervals between opening the first, second, and third reception windows, and use the second clock signal during the first, second, and third reception windows.

9. The electronic device of claim 1, wherein the electronic device is a scanner device in accordance with a Bluetooth Low Energy (BLE) protocol.

10. The electronic device of claim 1, wherein the controller is a Bluetooth controller.

11. The electronic device of claim 1, wherein the electronic device is configured to have a first power consumption during the first reception window, and a second power consumption during an interval between the first and second reception windows, wherein the second power consumption is lower than the first power consumption.

12. A method comprising:
   opening, by an electronic device, a first reception window having a first duration;
   in response to determining that a synchronized transmission has not been received by the electronic device during the first reception window, determining a second duration that is longer than the first duration;
   closing the first reception window;
   opening a second reception window having the second duration;
   in response to receiving a first synchronized transmission during the second reception window, determining a third duration based on a time difference between opening the second reception window and reception of the first synchronized transmission;
   closing the second reception window; and
   opening a third reception window having the third duration.

13. The method of claim 12, wherein the second duration corresponds to a maximum clock drift between the electronic device and a wireless device.

14. The method of claim 13, further comprising receiving, by the electronic device, a data packet indicative of the maximum clock drift of the wireless device; and
   determining the second duration based on the data packet.

15. The method of claim 14, wherein determining the second duration is further based on a drift of an oscillator of the electronic device.

16. The method of claim 12, wherein the third duration is shorter than the second duration.

17. The method of claim 12, wherein the first synchronized transmission is an advertisement.

18. The method of claim 12, further comprising using a first clock signal during intervals between opening the first, second, and third reception windows, and a second clock signal during the first, second, and third reception windows.

19. The method of claim 12, wherein the electronic device is a scanner device in accordance with a Bluetooth Low Energy (BLE) protocol.

20. The method of claim 12, wherein the electronic device has a first power consumption during the first reception window, and a second power consumption during an interval between the first and second reception windows, wherein the second power consumption is lower than the first power consumption.

* * * * *